United States Patent Office 3,028,381
Patented Apr. 3, 1962

3,028,381
6-METHYL STEROID DERIVATIVES AND
PROCESSES OF PREPARING SAME
Vladimir Petrow and David Morton Williamson, London, England, assignors to The British Drug Houses Limited, London, England, a British company
No Drawing. Filed July 6, 1959, Ser. No. 824,961
Claims priority, application Great Britain July 9, 1958
6 Claims. (Cl. 260—239.5)

This invention is for improvements in or relating to organic compounds and has particular reference to the preparation of new 6:16-dimethylpregnane derivatives which are of value as intermediates in the preparation of 17α-hydroxy- and 17α-acyloxy 6:16-dimethyl derivatives of pregnane which are valuable as progrestational agents.

In particular 17α-acetoxy-6α,16-dimethylprogesterone is found to be 100 times more potent than dimethisterone (6α,21 - dimethylethisterone; 6α,21 - dimethylanhydrohydroxyprogesterone) in the Clauberg assay. As dimethisterone (6α,21-dimethylethisterone) is known to be slightly more than 10 times as active as anhydrohydroxyprogesterone (ethisterone) in the Clauberg assay (David, Hartley, Millson and Petrow, J. Pharm. Pharmacol, 1957, 9, 929), it will be apparent to those skilled in the art that 17α-acetoxy-6α16-dimethylprogesterone is a progestational agent of quite unexpected and remarkable potency, and its preparation a matter of importance.

It is an object of the present invention to provide the new compounds 3β-hydroxy- and 3β-acyloxy- 6:16-dimethylpregna-5:16-dien-20-one (I; R=H or an acyl group containing up to 10 carbon atoms)

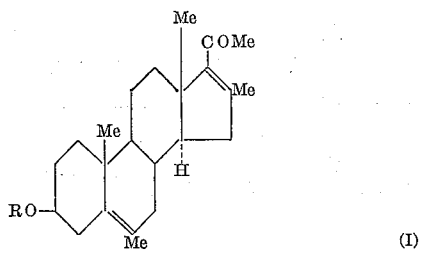

(I)

The above compounds are valuable and convenient starting materials for the preparation of the potent progestational agent 17α-acetoxy-6α,16-dimethylprogesterone. Their conversion into this progestational agent may be accomplished by converting compound I into the 3-oxo-derivative, 6α:16-dimethylpregna-4:16-dien-3:20-dione

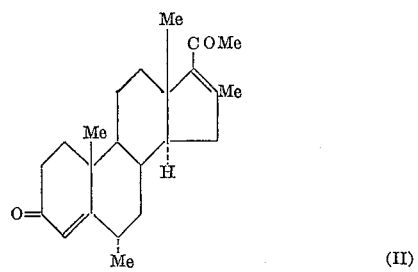

(II)

forming the 16α,17α-epoxide, converting this 16α,17α-epoxide into a 17α-hydroxy-16β-halo-16α-methyl intermediate by reaction with a halohydrin, reductively removing the halogen atom and acetylatnig the tert.-hydroxyl group at $C_{17}$.

The present invention also provides the intermediate pyrazolines 3β-hydroxy- and 3β-acyloxy-6-methyl-16:17-(2':3' - diazacyclopent-2'-eno)-pregn-5-en-20-one (III; R=H or acyl)

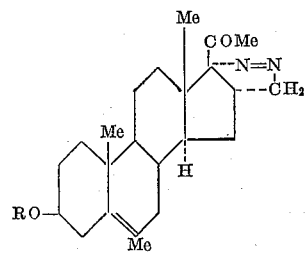

(III)

According to the present invention there is provided a process for the preparation of 3β-hydroxy and 3β-acyloxy-6:16-dimethylpregna-5:16-dien-20-one which process comprises reacting the corresponding 3β-acyloxy or 3β-hydroxy-6-methylpregna-5:16-dien-20-one (IV) where R=H or an acyl group containing up to 10 carbon atoms

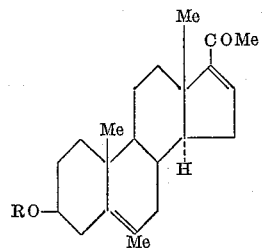

(IV)

with diazomethane to yield the corresponding 16α,17α-methylene diazo derivative (III) or pyrazoline and thermally decomposing the pyrazoline.

Addition of diazomethane to the starting material (IV) is preferably performed in an unreactive organic solvent such as diethyl ether and the reaction mixture allowed to stand at room temperature for periods of 16 to 40 hours, and the pyrazoline subsequently isolated by removal of the solvent by evaporation and crystallisation of the residue.

Decomposition of the pyrazoline (III) to yield the 6:16-dimethylpregnane derivative (I) may readily be performed by heating the pyrazoline under reflux in an inert organic solvent of B.P. approximately the same as the M.P. of the pyrazoline, such as dibutyl ether, for 3 to 5 hours. p-Cymene and ethylene glycol are other solvents suitable for effecting this thermal decomposition.

Conversion of I (where R=acyl) into I (where R=H) may readily be effected by alkaline hydrolysis, for example by heating the acyl derivative with the carbonate or hydroxide of an alkali metal in an aqueous/organic solvent mixture such as aqueous acetone or aqueous tert.-butanol.

Following is a description by way of example of methods of carrying the invention into effect.

*Example 1*

3β - acetoxy-6-methyl-16:17-(2':3'-diazacyclopent-2'-eno)-pregn-5-en-20-one (III; R=Ac): 3βacetoxy-6-methylpregna-5:16-dien-20-one (IV) (20 gm.) was treated with a solution of diazomethane prepared from N-methyl-N-nitroso-toluene-p-sulphonamide (125 gm.) in diethyl ether (750 mls.) and the mixture was allowed to stand at room temperature overnight (16 hours). Excess diazomethane was destroyed by addition of dilute acetic acid, and the ethereal layer washed with water, sodium bicarbonate solution, water and dried. The ether was removed under reduced pressure and the residue crystallised from methanol to yield 3β-acetoxy-6-methyl-16:17-(2':3' - diazacyclopent - 2'- eno)-pregn-5-en-20-one (III; R=Ac), plates, M.P. 156 to 158° C. with decomposition, $[\alpha]_D^{23}$ —14° (c., 0.44 in chloroform).

3β - acetoxy-6:16-dimethylpregna-5:16-dien-20-one (I; R=Ac): The foregoing pyrazoline (III; R=Ac) (20 gm.) was dissolved in dibutyl ether (200 ml.) and the solution heated under reflux for 3 hours. The dibutyl ether was removed under reduced pressure and the residue crystallised from methanol to give 3β-acetoxy-6:16-dimethylpregna-5:16-dien-20-one (I; R=Ac), plates, M.P. 158 to 160° C., $[\alpha]_D^{24}$ —41° (c., 0.654 in chloroform), $$\lambda_{max.}^{EtOH} \ 251 \ m\mu, \ \epsilon = 8650$$

3β-hydroxy-6:16-dimethylpregna-5:16-dien-20-one (I; R=H): The foregoing 3β-acetoxy-6:16-dimethylpregna-5:16-dien-20-one (I; R=Ac) (2 gm.) was hydrolysed by heating under reflux with potassium hydroxide (2 gm.) in methanol (80 ml.) and water (20 ml.) for 1 hour. The mixture was poured into water and the precipitate filtered off, washed with water, dried and crystallised from methanol to give 3β-hydroxy-6:16-dimethylpregna-5:16-dien-20-one (I; R=H), plates, M.P. 148 to 149° C., $[\alpha]_D^{24}$ —99° (c., 0.292 in chloroform), $$\lambda_{max.}^{EtOH} \ 251 \ to \ 253 \ m\mu, \ \epsilon \ 8806$$

*Example 2*

3β-hydroxy-6:16-dimethylpregna-5:16-dien-20-one (I; R=H): 3β - hydroxy-6-methylpregna-5:16-dien-20-one (IV; R=H) (20 g.) was treated with an ethereal solution of diazomethane in the manner described in Example 1. The crude pyrazoline (III; R=H) thus obtained was dissolved in dibutyl ether (200 ml.) and the solution heated under reflux for 3 hours. After removal of the dibutyl ether, the residue was crystallised from methanol to give 3β-hydroxy-6:16-dimethylpregna-5:16-dien 20-one, M.P. 148 to 149° C., identical with a specimen prepared as described above.

We claim:

1. A process for the preparation of 3β-hydroxy- and 3β-acyloxy-6:16-dimethylpregna-5:16-dien-20-one which process comprises reacting the corresponding 3β-acyloxy or 3β-hydroxy-6-methylpregna-5:16-dien-20-one with diazomethane to yield the corresponding 16α,17α-methylene diazo derivative and heating to thermally decompose said 16α,17α, methylene diazo derivative.

2. A process as claimed in claim 1 wherein the diazomethane in diethyl ether is added to the steroid starting material and the reaction mixture allowed to stand at room temperature for periods of 16 to 40 hours.

3. A process as claimed in claim 1 wherein the 16α, 17α-methylene diazo derivative is decomposed by heating under reflux in an inert organic solvent of B.P. approximately the same as the M.P. of the 16α,17α-methylene diazo derivative.

4. A process as claimed in claim 3 wherein the inert organic solvent is dibutyl ether and the heating under reflux is carried out for 3 to 5 hours.

5. 3β-hydroxy- and 3β-acyloxy-6:16-dimethylpregna-5:16-dien-20-one

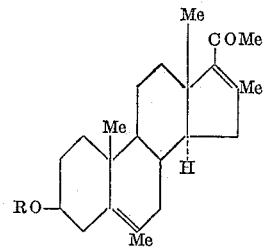

(I)

where R=H or an acyl group containing up to 10 carbon atoms.

6. 3β-hydroxy- and 3β-acyloxy-6-methyl-16:17-(2':3'-diazacyclopent-2'-eno)-pregn-5-en-20-one

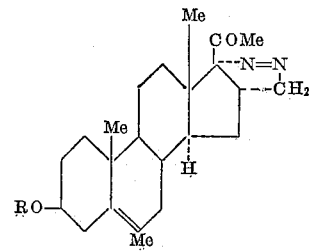

(III)

where R=H or an acyl group containing up to 10 carbon atoms.

References Cited in the file of this patent
UNITED STATES PATENTS 2,888,457   Beyler et al. _____ May 26, 1959

OTHER REFERENCES

Journal of Chemical Society (1957), article by Burn et al., pages 40–94 relied on.